(12) United States Patent
Robertson, Jr.

(10) Patent No.: US 7,079,875 B2
(45) Date of Patent: Jul. 18, 2006

(54) HOUSING ASSEMBLY WITH BIASED AND REMOVABLE DOOR

(75) Inventor: William H. Robertson, Jr., Ft. Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 91 days.

(21) Appl. No.: 10/741,996

(22) Filed: Dec. 19, 2003

(65) Prior Publication Data

US 2005/0136996 A1    Jun. 23, 2005

(51) Int. Cl.
*H04M 1/00*    (2006.01)

(52) U.S. Cl. .............................. 455/575.1; 455/575.4; 455/575.8; 455/575.3; 455/90.3; 379/433.13

(58) Field of Classification Search ............. 455/575.1, 455/575.4, 575.8, 90.3, 575.3; 379/433.13
See application file for complete search history.

(56) References Cited

U.S. PATENT DOCUMENTS 5,060,990 A * 10/1991 Smith et al. .................. 292/91
6,226,189 B1 * 5/2001 Haffenden et al. .......... 361/814
6,345,097 B1 * 2/2002 Chintala et al. ........ 379/433.13
6,397,078 B1 * 5/2002 Kim ......................... 455/556.2
6,415,138 B1 * 7/2002 Sirola et al. ................ 455/90.1
6,788,919 B1 * 9/2004 Watanabe ................... 455/90.3
6,839,432 B1 * 1/2005 Martin ........................ 379/446
6,859,978 B1 * 3/2005 Pan .............................. 16/292
2004/0204201 A1 * 10/2004 Pan ........................ 455/575.1

* cited by examiner

*Primary Examiner*—Matthew Anderson
*Assistant Examiner*—Minh Dao

(57) ABSTRACT

A housing assembly (100) provides a device housing (102) having an outer surface (104) and having a compartment (106). A door (108) can be movably coupled to the housing where the door can be movable from a closed position through an open position. The door can at least partially enclose the housing compartment in the closed position. The housing assembly also provides a biasing member (110) biased against the door to move the door to the open position. In another embodiment, a housing assembly (200) can also include a frame member (201) designed to be removably interlockable with the housing assembly and a door (208) movably coupled to the frame member.

19 Claims, 5 Drawing Sheets

HOUSING ASSEMBLY WITH BIASED AND REMOVABLE DOOR

CROSS REFERENCE TO RELATED APPLICATIONS

Not Applicable.

FIELD OF THE INVENTION

This invention relates in general to housing assemblies, and more particularly, to housing assemblies having doors for enclosing compartments.

BACKGROUND OF THE INVENTION

Electronic devices continue to evolve rapidly with constant improvements in designs, features, materials, and components. Further, electronic devices continue to improve in performance and in overall design. One common goal among electronic device designers concerns designs that are rugged while not proving too cumbersome for daily use. Thus, many designs have been introduced to reduce the size of electronic devices without sacrificing performance or durability. Trends in designing have lead to smaller sized devices; however, such smaller sized devices require innovative housing designs to incorporate functions and features, particularly features not present in earlier designs.

Most electronic devices include a housing assembly that contains the electronic parts and components of the electronic device. While housing assemblies typically include an outer shell which functions to both hold the components of the device and to protect the components of the electronic device from external elements, typical user operation of the device requires that the housing be at least partially removable for inner device access. For instance, in many electronic devices, batteries that are internally housed during normal operation may need to be accessed by the user for replacements and/or re-charging. Similar to batteries, many other internally housed components of a device may need to be accessed by the user. Accordingly, such device housings cannot be sealed.

Thus, many housings have been designed to grant internal housing access to the user. For instance, some housings incorporate screws that must first be unscrewed before internal access can be gained. Other housings include covers that can be completely removed from the housing to gain access. While such a design provides internal access, in many instances, the cover can be misplaced and even lost. In such a situation, the internal space of the housing can remain permanently exposed to environmental elements until a replacement part is obtained and installed.

SUMMARY OF THE INVENTION

In one embodiment of the present invention, a housing assembly can include a device housing having an outer surface and having a compartment. A door can be movably coupled to the housing and the door can be movable from a closed position through an open position where the door can at least partially enclose the housing compartment in the closed position. The housing assembly further includes a biasing member that can be biased against the door to move the door to the open position.

The door can also include an inner structure and an outer structure where the inner structure and the outer structure can be slidably coupled for allowing relative movement. In one arrangement, the inner structure can form part of the biasing member. Additionally, the inner structure can be movably coupled to the housing and the outer structure can be free of the housing. In another arrangement, the outer structure can be designed to at least partially enclose the compartment and the outer structure can form a portion of the housing outer surface. Further, the outer structure can enclose the compartment when the door is in the closed position.

In one embodiment, the housing can include a removable card slot. The outer structure can prevent access to the removable card slot when the door is in the closed position and can allow access when the door is in the open position. Additionally, the inner structure can provide a display surface. In one arrangement, the display surface can be a reflective surface.

In another embodiment, the housing can include a mating structure and the outer structure can include a protrusion. The protrusion can engage the mating structure in the closed position to secure the door in the closed position. The mating structure can be a recess, an aperture, or other structure suited to receive the protrusion. Additionally, the housing assembly can form a portion of a communication product and the housing compartment can form at least a portion of a battery compartment.

In another aspect of the invention, a housing assembly can include a main housing having an outer surface and a compartment area. A biasing member can be coupled to the main housing and a door can be slidably coupled to the biasing member. The door can engage the main housing solely in a closed position and can move relative to the biasing member when not in the closed position. The biasing member can include an inner substantially planar member that can move relative to the door. Additionally, the inner substantially planar member can provide a reflective surface.

In still another aspect of the invention, a housing assembly can include a device housing having a compartment. A door can be movably coupled to the housing and shaped to at least partially enclose the compartment. The door can be movable through an open position to a closed position and a biasing member can be biased against the door to move the door to the open position. The door can include an outer planar member and an inner planar member slidably coupled together where the inner planar member can be movably coupled to the housing. In one arrangement, the inner planar member can provide a reflective surface. Additionally, the housing can include a removable card slot and the outer planar member can prevent access to the removable card slot when the door is in the closed position and can allow access when the door is in the open position.

In still another aspect of the invention, a removable door assembly for a main housing assembly is provided. The removable door assembly can include a frame member designed to be removably interlockable with a housing assembly. The removable door assembly can also include a door movably coupled to the frame member and a biasing member coupled to one or more of the frame member and the door member where the biasing member forces movement of the door relative to the frame member.

In one arrangement, the door can be designed to at least partially enclose a portion of a compartment provided by the housing. The door can further include an inner structure and an outer structure where the inner structure and the outer structure can be slidably coupled for allowing relative movement. Also, the inner structure can form part of the biasing member. The inner structure can be movably coupled to the frame member and the outer structure can be free to slide relative to the inner structure.

In another arrangement, the outer structure can be designed to form a portion of an outer surface of the housing. The inner structure can provide a display surface. The display surface can be a reflective surface. The outer structure can further include a protrusion for engaging a mating structure provided by the housing, wherein the engagement secures the door in a closed position.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION

Figure 1:
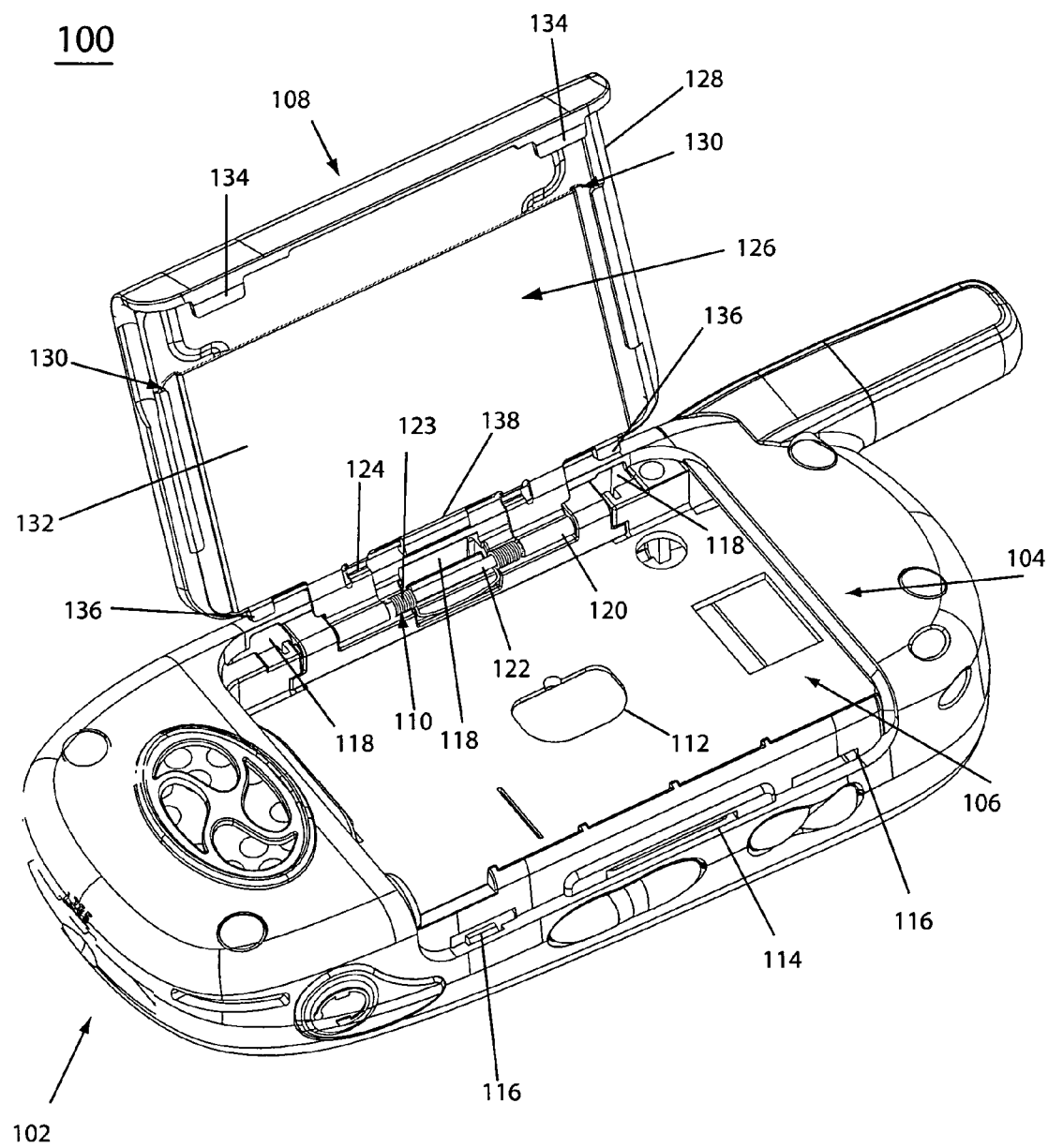
FIG. 1 illustrates one embodiment of a housing assembly having a door in an open position in accordance with the inventive arrangements.

While the specification concludes with claims defining the features of the invention that are regarded as novel and non-obvious, it is believed that the invention will be better understood from a consideration of the following description in conjunction with the figures, in which like reference numerals are carried forward.

The invention provides a housing assembly 100 for a device, such as a communications product. Referring to FIG. 1, one embodiment of a housing assembly 100 providing internal housing access is shown. The housing assembly 100 can include a housing 102, a housing outer surface 104, a compartment 106, a door 108, and a biasing member 110. The compartment 106 can include space for multiple components of the associated device, such as a battery, and the geometric dimensions of the compartment 106 can be varied according to the geometric dimensions of the object(s) to occupy the space. For example, battery packs using different cell technologies for different portable electronic devices come in various geometric configurations. The housing 102 can also include an integrated circuit card holder 112 and slot 114 and mating structures 116 and 118 to be used in securing the door 108. The housing 102, the housing outer surface 104, the compartment 106, and the door 108, can be constructed of plastic, metal, ceramic, hard rubber, or any other suitable material.

The door 108 can be movably coupled to the housing 102 to allow the door 108 to move to opened (FIG. 1) and closed (see FIG. 3) positions. The opened position provides at least access to the compartment 106 and can generally provide internal housing access. In contrast, in the closed position, the door 108 can at least partially, if not completely, prevent compartment 106 access. Further, in the closed position, the door 108 can be secured to the housing 102 to prevent unintentional opening of the door 108.

The door 108 can be movably coupled to the housing 102 with a variety of attachments, such as hooks, mechanical fasteners, and the like, that provide a movable coupling and allow the door 108 to be moved from an open position to a closed position. For instance, the door 108 can include angled and/or bent mounting members 120 that are hinged on an axle 122 that is coupled or otherwise provided by the housing 102. In such an arrangement, the door 108 can be pivoted to provide access to compartment 106 while remaining coupled to the housing 102, and therefore, prevent misplacement and/or loss of the door 108. Nevertheless, the invention is not limited in this regard, as the door 108 can be movably coupled with any suitable components and arrangements, such as a groove and channel design that provides for a sliding movement of the door 108 between closed and opened positions.

The biasing member 110 can be positioned against the door 108 to move the door 108 to the open position. The biasing member 110 can include a spring 123 with a lever arm 124 that is arranged so that the spring is compressed when the door 108 is advanced to the closed position. In such an arrangement, the compressed biased member 110 will attempt to release the compression by forcing the door 108 to the opened position. Thus, when not secured to the housing 102, the door 108 can move to the opened position without user manipulation operation. Such movement caused by the biasing member 110 can also ease one handed operation where the user need only release the door 108 from a secured position and the door 108 will move to the opened position. Also, the biasing member 110 can be constructed of any material, such as metals, plastics, composite materials, and the like that can provide a biased force.

It should be noted that the biasing member 110 is not limited to a spring, as any other component and/or arrangement, such as a substantially planar member that is biased through bending, is suitable. For instance, the biasing member can be formed from a portion of the door 108. A portion of the inner structure 226 can provide the biasing member 110 as a substantially planar member with a biased portion. Accordingly, in such an arrangement, the inner substantially planar member can move relative to the door 108. Also in such an arrangement, the inner substantially planar member can provide the display surface 132 as a reflective surface.

Accordingly, a spring and/or a biased portion of a substantially planar member that is arranged in compression can provide the biasing member 110 that forces the entire door 108 to the opened position. Further, the biasing member 110 is not limited to being in compression as one skilled in the art will recognize that a biasing member 110 can be arranged in tension to force the door 108 to the opened position.

The door 108 can include an inner structure 126 (or inner planar member 126) and an outer structure 128 (or outer planar member 128) where the inner structure 126 and the outer structure 128 are slidably coupled for allowing relative movement. The inner structure 126 can be coupled to the housing 102 and the outer structure 128 can be slidably coupled to inner structure 126. In this arrangement, the inner structure 126 can be slidably disposed within channels 130 provided by the outer structure 128 that allow for sliding of the outer structure 128 relative to the inner structure 126. Note, that in one embodiment, the inner structure 126 can form a part of the biasing member that biases the door 108 to the open position.

Figure 2:
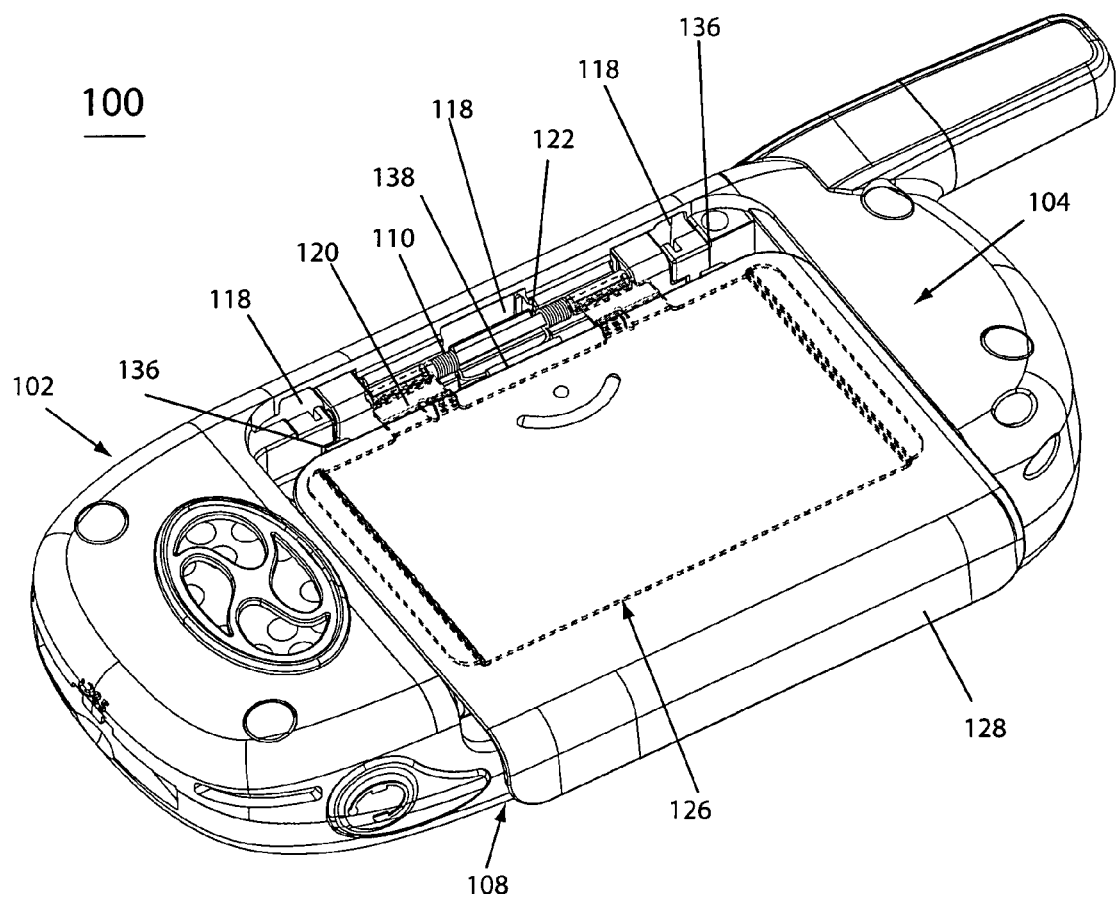
FIG. 2 illustrates one arrangement of the housing assembly shown in FIG. 1 with the door in a partially closed position and portions of the housing assembly shown in phantom.
Figure 3:
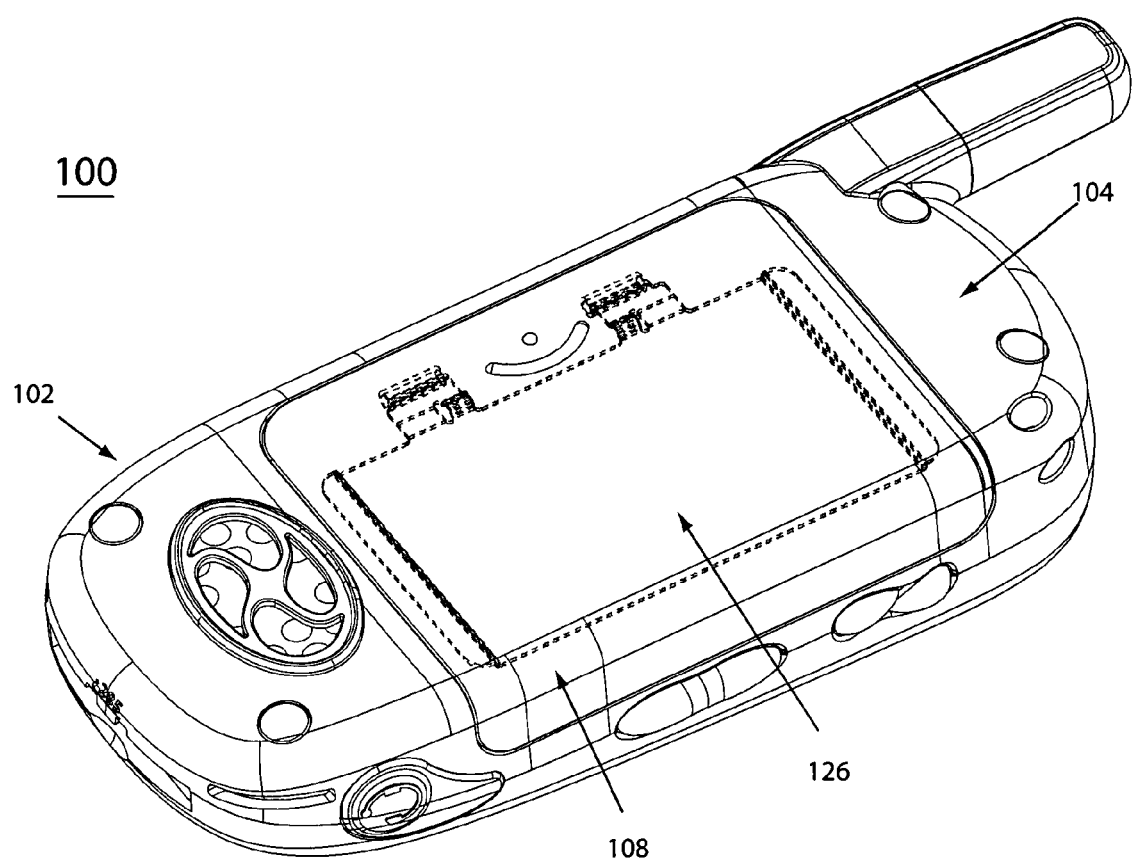
FIG. 3 illustrates another arrangement of the housing assembly shown in FIG. 1 with the door in a closed position and portions of the housing assembly shown in phantom.

As illustrated by reviewing FIG. 2 then FIG. 3 which both depict a stationary inner structure 126 shown in phantom, the outer structure 128 can slide relative to the inner structure 126 and the outer structure 128 can move free of housing 102. The biasing member 110, in accordance with the above discussion, can force open the door 108. Further, it should be noted that the inner structure 126 and the outer structure 128 can be slidably coupled with any suitable components and arrangements for allowing such relative sliding movement. Also, it should be noted that outer structure 128 can be coupled to the housing 102 where the inner structure 126 is free of housing 102 and can slide relative to the outer structure 128.

The inner structure 126 can also provide a display surface 132 that can be oriented for convenient viewing when the door 108 is moved to the open position as shown in FIG. 1. The display surface 132 can be constructed of a reflective material, that can reflect at least visible spectrum of light with wavelengths ranging from approximately $7 \times 10^{-7}$ m to $4 \times 10^{-7}$ m. A non-exclusive list of such reflective materials can include mirrored glass, polished metals, reflective metals, and mirrored films. In such an arrangement, the display surface 132 can provide the user with a portable mirror for convenient appearance checks and fixes similar to a cosmetic compact case.

In another arrangement, the display surface 132 can provide a surface for displaying a label. A non-exhaustive list of the possible labels that can be displayed on the display surface 132 includes an advertisement, a company logo, device operation instructions, safety warnings, battery removal instructions, and personal information, such as addresses. Although some of the listed information could most likely be saved electronically in the associated device, displaying information on the display surface 132 will make the information readily available in the event of a power failure, or simply available to a user who is not comfortable using stored information services available on many devices. However, because the display surface 132 is not viewable when the door 108 is in the closed position, the display surface 132 can keep the displayed information confidential.

The outer structure 128 can also include a protrusion 134 or multiple protrusions 134, 136, and 138 to be used to secure the door 108 in the closed position. The protrusions 134, 136, and 138, can be placed to align with the mating structures 116 and 118 during the closing motion. Focusing on FIGS. 2 and 3, in the closed position, the protrusions 134, 136, and 138 can engage respective mating structures 116 and 118. The mating structures 116 and 118 can include apertures and recesses or any other structure that can be securely engaged by the protrusions 134, 136, and 138. Additionally, the protrusions 134, 136, and 138 can include angled portions, such as a hook, for added securement of the door 108 in the closed position.

The outer structure 128 can be designed to at least partially enclose the compartment 106. By enclosing or partially enclosing the compartment 106, the outer structure 128 can prevent compartment objects, such as a battery, from unintentionally being removed from the compartment 106. With the door 108 in the closed position, the outer structure 128 can enclose the compartment. Further, the outer structure 128 can form a portion of the outer surface 104 of the housing 102. For example, the outer structure 128 can be dimensioned to form a substantially continuous surface with the outer surface 104 of the housing 102. Additionally, in the closed position, the door 108 can prevent access to the integrated circuit card slot 114; however, in the open position, the door can allow access to the integrated circuit card slot 114. Such access can allow the user to easily install and remove an integrated circuit card by simply sliding the integrated circuit card through the integrated circuit card slot 114 and into or out of the integrated circuit card holder 112.

Also in accordance with the inventive arrangements, a removable door assembly for a main housing assembly is provided. A removable door assembly can allow the user to equip the main housing assembly with a variety of doors to change the look of the phone, such as providing different color doors with different designs. Additionally, changing the door can provide additional function to the main housing assembly, such as providing a more voluminous compartment for holding a larger sized battery or for storage of personal items. Of course, a replacement door can also provide a different configuration that reduces the size of the compartment if desired.

Figure 4:
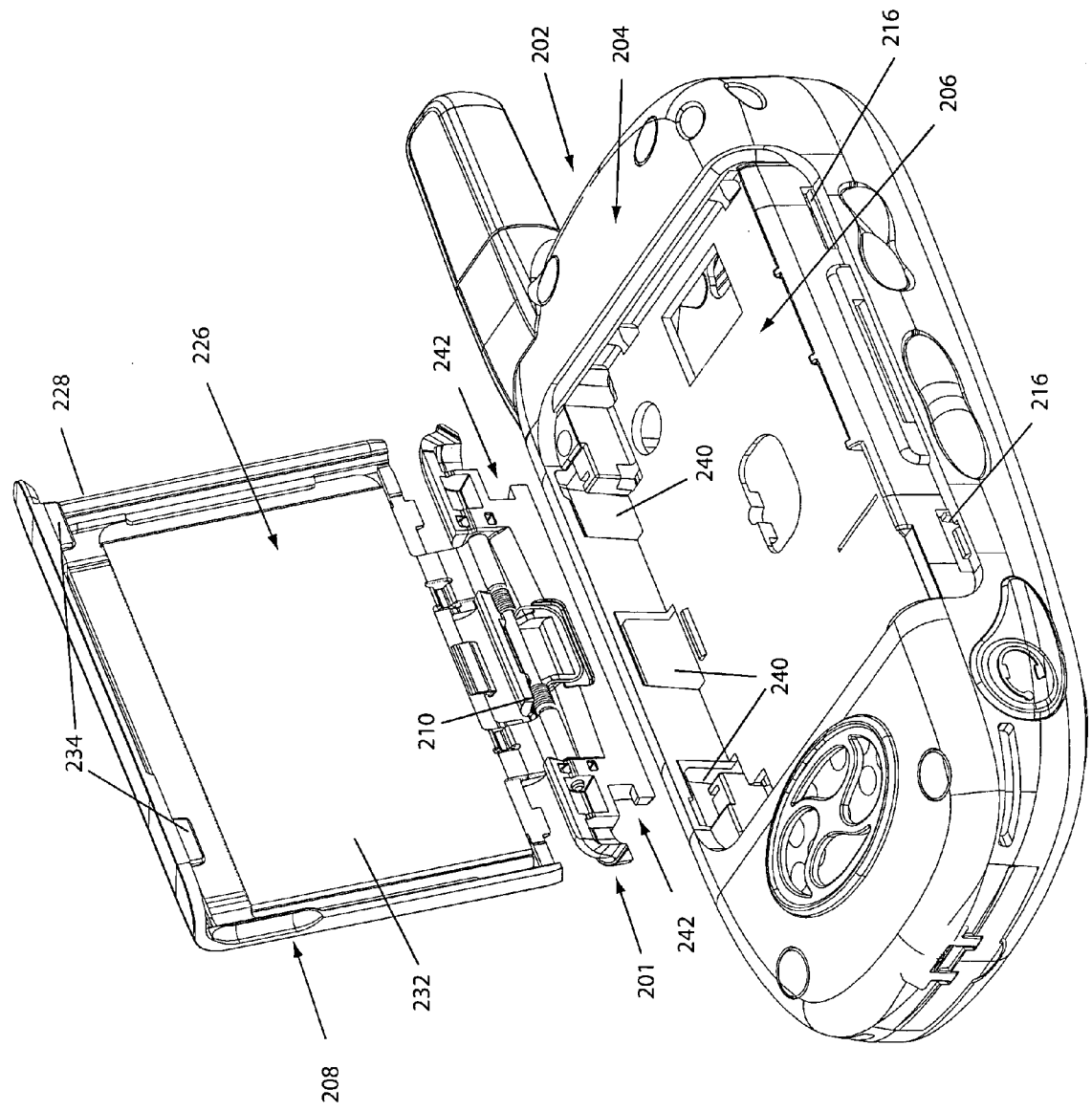
FIG. 4 illustrates one embodiment of a removable door assembly detached from a main housing assembly.

FIG. 4 illustrates one embodiment of a removable door assembly 200 detached from a main housing assembly 202. The removable door assembly 200 can include a frame member 201, a door 208, and a biasing member 210. Additionally, the housing 202 can include an outer surface 204 and a compartment 206. Similar to the embodiments discussed above, the door 208 can be movably coupled to the frame member 201 and the biasing member 210 can be coupled to at least the frame member 201 and the door 208. The biasing member 210 can force movement of the door relative to the frame member 201. Accordingly, when the door assembly 200 is attached to the housing 202, the biasing member 210 can force the door 208 to an open position.

The frame member 201 can include a structure that can be designed to be removably interlockable with the housing 202. The geometric dimensions of the frame member 201 can be designed to anatomically mate with the housing 202 so that the frame member 201 can snap into the appropriate recesses and apertures provided by the housing 202. For instance, the projections 242 of the frame member 201 can be designed to correspond to the dimensions of apertures 240 provided by housing 202. These projections 242 can snap engage the apertures 240. When the frame member 201 is inserted into apertures 240, the frame member 201 and the other parts of the removable door assembly 200, can be securely coupled to the housing 202. Thus, in such an arrangement, the frame member 201 can be secured to the housing 202 without any mechanical attachments, such as hooks, screws, and/or glue. Nevertheless, it should be noted that mechanical attachments can be provided to further secure the frame member 201 to the housing 202.

The frame member 201 and/or the housing 202 can be constructed of a semi-flexible material, such as plastic, that can allow for slight deflections and bending. In such an arrangement, the frame member 201 can be snapped securely to the housing 202 by slightly bending the housing 202 and/or the frame member 201 during insertion. Further, it should be noted that the frame member 201 and the housing 202 can each be constructed of different materials, with one being constructed of semi-flexible material and the other being constructed of a less flexible material, to facilitate removal and insertion of the frame member 201. For instance, the frame member 201 can be constructed of a rigid material, such as a metal, and the housing 202 can be constructed of a semi-flexible material, such as a plastic. In this arrangement, during attachment and during removal of the door, the housing 202 can flex and bend slightly to allow the rigid frame member 201 to be attached to and to be removed from housing 202. Nevertheless, the invention is not limited in this regard as the housing 202 and the frame member 201 can be constructed of the same material, and the housing 202 can be constructed of a relatively more rigid material compared to the material of which the frame member 201 is constructed.

Similar to the embodiments discussed above, the door 208 can include an inner structure 226 and an outer structure 228, where the inner structure 226 and the outer structure 228 can be slidably coupled for allowing relative movement. In such an arrangement, the inner structure 226 can be movably coupled to the frame member 201, by a hingeable and/or rotateable arrangement, and the outer structure 228 can be free to slide relative to the inner structure 226. The inner structure 226 can also form a part of the biasing member 210, such as a portion of pre-biased metal bent to a biased state. Further, the outer structure 228 can include protrusions 234 for engaging a mating structure 216 providing by the housing 202 for securing the door 208 in a closed position. Further note that a "biasing member" can also be interpreted as including the biasing member 210, the inner structure 226 as well as the frame member 201. The biasing member 210 can facilitate the opening of the door 208, similar to the embodiments previously described.

Also similar to the embodiments discussed above, the inner structure 226 can provide a display surface 232. The display surface 232 can display information, such as personal information, instructions, and/or advertisements, and can also be a reflective surface, such as a mirror, metal, and/or reflective film.

Figure 5:
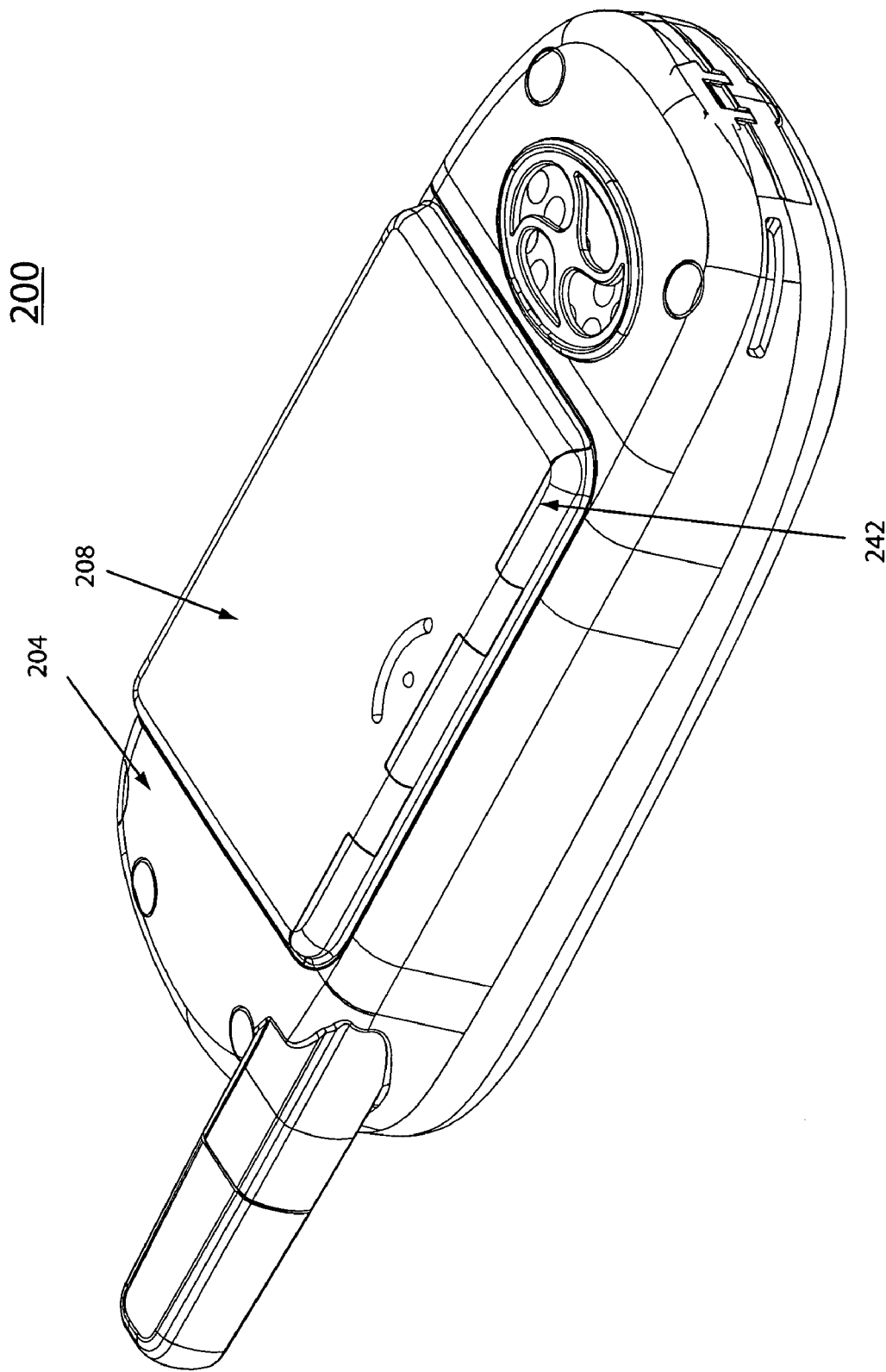
FIG. 5 illustrates a view of the removable door assembly, which is shown in FIG. 4, attached to the main housing assembly.

Referring to FIG. 5, a removable door assembly 200 is shown coupled to a housing assembly 202 with the door 208 shown in a closed position. In this arrangement, the door 208 can form a portion of the outer surface 204 of the housing 202. Although the door 208 is shown as completely enclosing the compartment 206 provided by the housing 202, it should be noted that the door 208 can include openings and/or can simply only partially enclose the compartment 206. Further, the door 208 can include an extended portion 242 that can expand the volume enclosed by the door 208. Such a door 208 can allow for the insertion of a larger battery with a greater amount of stored energy, useful for greater energy requirements. With the door assembly 200 being easily removable, the door assembly 200 can be changed to accommodate different use circumstances, such as a larger door accommodating a greater capacity battery or a slimmer door for unobtrusive storage in a clothing pocket.

Although the figures depict a mobile phone housing assembly, one skilled in the art will appreciate that embodiments in accordance with the invention include other devices, such as cordless phones, two way radios, pagers, personal digital assistants, laptop computers, and the like. Additionally, the description above is intended by way of example only and is not intended to limit the present invention in any way, except as set forth in the following claims.

What is claimed is:

1. A housing assembly, comprising:
    a device housing having an outer surface and having a compartment;
    a door movably coupled to the housing, the door movable from a closed position through an open position, the door at least partially enclosing the housing compartment and releasably secured the housing in the closed position;
    a biasing member biased against the door to move the door to the open position;
    wherein the door further comprises an inner structure and an outer structure, the inner structure and the outer structure being slidably coupled for allowing relative movement such that when the outer structure is slid relative to the inner structure, the door no longer is secured to the housing and the biasing member moves the door to the open position.

2. The housing assembly according to claim 1, wherein the inner structure forms part of the biasing member.

3. The housing assembly according to claim 1, wherein the inner structure is movably coupled to the housing and the outer structure is free of the housing when not in the closed position.

4. The housing assembly according to claim 1, wherein the outer structure is designed to at least partially enclose the compartment.

5. The housing assembly according to claim 1, wherein the outer structure forms a portion of the housing outer surface.

6. The housing assembly according to claim 1, wherein the outer structure encloses the compartment when the door is in the closed position.

7. The housing assembly according to claim 1, the housing further comprising a removable card slot, the outer structure preventing access to the removable card slot when the door is in the closed position and allowing access when the door is in the open position.

8. The housing assembly according to claim 1, wherein the inner structure provides a display surface.

9. The housing assembly according to claim 8, wherein the display surface is a reflective surface.

10. The housing assembly according to claim 1, the housing further including a mating structure, the outer structure further including a protrusion, wherein the protrusion engages the mating structure in the closed position to secure the door in the closed position.

11. The housing assembly according to claim 10, wherein the mating structure is selected among a recess and an aperture.

12. The housing assembly according to claim 1, wherein the housing assembly forms a portion of a communication product and the housing compartment forms at least a portion of a battery compartment.

13. The housing assembly according to claim 1, wherein at least a portion of the door provides a frame member designed to removably interlock with the housing assembly to permit the frame member to be completely removed from the housing assembly.

14. A housing assembly, comprising:
    a device housing having a compartment;
    a door movably coupled to the housing and shaped to at least partially enclose the compartment; the door movable through an open position to a closed position;
    a biasing member biased against the door to move the door to the open position, wherein the door comprises an outer planar member and an inner planar member slidably coupled together, wherein the inner planar member is movably coupled to the housing and the outer planar member is releasably secured to the device housing when the door is in the closed position and is no longer secured to the device housing when the outer planar member is slid relative to the inner planar member.

15. The housing assembly according to claim 14, wherein the inner planar member provides a reflective surface.

16. The housing assembly according to claim 14, the housing further comprising a removable card slot, the outer planar member preventing access to the removable card slot when the door is in the closed position and allowing access when the door is in the open position.

17. A removable door assembly for a main housing assembly, comprising:
    a frame member designed to be removably interlockable with the main housing assembly;
    wherein the frame member is completely removable from the main housing;
    a door movably coupled to the frame member;
    a biasing member coupled to at least one of the frame member and the door, wherein the biasing member forces movement of the door relative to the frame member;
    wherein the removable door assembly permits other doors to be used with the main housing assembly;
    wherein the door further comprises an inner structure and an outer structure, the inner structure and the outer structure being slidably coupled for allowing relative movement.

18. The door assembly according to claim 17, wherein the inner structure forms part of the biasing member.

19. The door assembly according to claim 17, wherein the inner structure is movably coupled to the frame member and the outer structure is free to slide relative to the inner structure.

\* \* \* \* \*